United States Patent [19]
Murphy et al.

[11] Patent Number: 5,865,152
[45] Date of Patent: Feb. 2, 1999

[54] ROTARY PISTON INTERNAL COMBUSTION ENGINE

[75] Inventors: Ian Murphy, Saffron Walden; Michael John Allan Woodley, Hitchin, both of United Kingdom

[73] Assignee: Plextex Limited, Great Britain

[21] Appl. No.: 666,379

[22] PCT Filed: Dec. 16, 1994

[86] PCT No.: PCT/GB94/02757

§ 371 Date: Aug. 1, 1996

§ 102(e) Date: Aug. 1, 1996

[87] PCT Pub. No.: WO95/16850

PCT Pub. Date: Jun. 22, 1995

[30] Foreign Application Priority Data

Dec. 17, 1993 [GB] United Kingdom ............... 93 258 77

[51] Int. Cl.$^6$ ................................. F02B 53/00
[52] U.S. Cl. .................. 123/237; 418/217; 123/240
[58] Field of Search .................... 123/236, 237, 123/243, 244, 240; 418/217

[56] References Cited

U.S. PATENT DOCUMENTS

| | | | |
|---|---|---|---|
| 1,686,767 | 10/1928 | Saxon | 418/217 |
| 2,818,839 | 1/1958 | Voigt | 418/217 |
| 3,769,945 | 11/1973 | Kahre | 418/217 |
| 3,942,484 | 3/1976 | Pile . | |
| 4,004,556 | 1/1977 | Pfeiffer . | |
| 4,096,846 | 6/1978 | Biles . | |
| 4,170,213 | 10/1979 | Williams | 123/237 |
| 4,401,070 | 8/1983 | McCann . | |
| 4,572,121 | 2/1986 | Chang . | |

FOREIGN PATENT DOCUMENTS

| | | |
|---|---|---|
| 0091289 | 10/1983 | European Pat. Off. . |
| 0397996 | 8/1984 | European Pat. Off. . |
| 0130171 | 1/1985 | European Pat. Off. . |
| 0208224 | 1/1987 | European Pat. Off. . |
| 2598746 | 11/1987 | European Pat. Off. . |
| 0397996 A3 | 9/1993 | European Pat. Off. . |
| 3235888 | 2/1984 | Germany ............... 123/237 |
| 491497 | 9/1938 | United Kingdom . |
| 734366 | 7/1955 | United Kingdom . |
| 1244287 | 8/1971 | United Kingdom . |
| 1275103 | 5/1972 | United Kingdom . |
| 1389772 | 4/1975 | United Kingdom . |
| 1394972 | 5/1975 | United Kingdom . |
| 2254888 | 10/1992 | United Kingdom . |

*Primary Examiner*—Michael Koczo
*Attorney, Agent, or Firm*—Galgano & Burke

[57] ABSTRACT

An internal combustion engine designed to convert thermal energy into mechanical energy according to the same general principle employed in conventional reciprocating piston-and-cylinder combustion engines, wherein the equivalent of the cylinder of the conventional engine is replaced by two series of chambers, a first series and a second series, each series of chambers being separately disposed in a circumferential arrangement about a common axis and separated in space one from another and wherein the conventional piston is replaced by one or more vanes, said vanes being adapted to form sealing contact with the chambers and the two series of chambers being connected by one or more transfer ports wherein air is compressed in one series of chambers and combustion gasses are exhausted by means of the other series of chambers.

11 Claims, 16 Drawing Sheets

ROTARY PISTON INTERNAL COMBUSTION ENGINE

FIELD OF THE INVENTION

The present invention relates to a new design of internal combustion engine.

BACKGROUND TO THE INVENTION

The internal combustion engine is widely used as a means of converting thermal energy into mechanical energy. It has been developed extensively over the past few decades, especially by motor vehicle manufacturers, into a compact, lightweight and efficient unit.

However, the principle of a reciprocating piston connected by means of a connecting rod to a crank shaft and constrained within a cylinder has inherent drawbacks. The piston, by the very nature of its function, has a significant mass and thus inertia. Consequently, the reciprocating motion causes vibration and also limits the maximum possible speed of rotation of the crank shaft.

The standard reciprocating engine, as used in automobiles, has both a relatively small mechanical efficiency and fuel efficiency. One reason for this is the short stroke of the engine. The limited amount of time possible for the power stroke leads to incomplete detonation. The inefficiency increases with engine speed because the time for combustion is correspondingly reduced.

Another disadvantage of the conventional piston engine results from valve overlap. Since both exhaust and intake valves are open at the same time, a proportion of the air/fuel mixture is exhausted unburnt. The thermal efficiency of the reciprocating engine is also considerably less than optimal. Detonation occurs before top dead center and so expansion of the gases causes the mixture to heat up rather than to provide work energy.

One further drawback is that the power stroke and the compression stroke are an identical length for any given piston. Since power is only derived on the exhaust or power stroke of the engine cycle, the efficiency of an engine could be improved by lengthening this part of the cycle. Although theoretically possible, the design of a conventional two stroke or four stroke engine does not lend itself to this.

Many attempts have been made to minimize or obviate these inherent disadvantages. The WANKEL (TM) or rotary piston engine is probably the most well-known of these, where a rotating piston is used to rotate a shaft and thus generate motive power. In this modification, the edges of a rotating piston open and close ports in a cylinder wall, so that the piston itself controls the "breathing" of the engine, without the aid of valves. The piston is substantially triangular in shape with convex sides and rotates in a cylinder whose internal cross-section has a substantially oval shape slightly constricted in the middle (epitrochoid). When the piston rotates, seals mounted at its three corners continuously sweep along the wall of the cylinder. The three enclosed spaces formed between the piston and the wall successively increase and decrease in size with each revolution. These variations in the spaces are utilized for drawing in the fuel-and-air mixture, for compressing this mixture, for combustion, and for discharging the burned gases. In this way, the full four-stroke working cycle is performed.

It will be appreciated that in the rotary piston engine there are no reciprocating masses which have to be alternatively accelerated and decelerated and the forces or inertia associated with the reciprocating motion are therefore obviated in this type of engine. As a result, higher speeds of rotation are theoretically possible.

However, one of the major problems in the construction of the rotary piston engine is the sealing of the three spaces in relation to one another. Intercommunication between these spaces would be detrimental to the proper functioning of the engine. This problem has been partly solved by means of a system of sealing strips.

However, the problem of wear and durability has only been partly resolved and as a consequence, these rotary engines have yet to find universal acceptance.

Many attempts have been made to improve the WANKEL engine, the most relevant of these known to the applicant being described in U.S. Pat. No. 4,401,070 (McCann). This describes an engine with a rotor and at least one vane extending slidably through the rotor in a transverse direction for rotation therewith. The vane has opposite ends extendible beyond the rotor, which itself rotates within a stator which has a hollow, cylindrical interior. The stator has opposite side walls with circumferentially extending depressions therein, the depressions of the opposite walls being staggered, causing transverse reciprocation of the vane as the rotor is rotated. The depressions are shaped to slidably receive the ends of each vane in sealing contact.

The stator is in effect two static housings which embrace the rotor and support it at either end of a rotor shaft. The housings contain two cavities formed in their ends into which the rotor plus sliding vanes fit.

This design relies upon a relatively complex series of ducts and holding volumes to transfer an aliquot of compressed gas from one side of a vane during the compression cycle to the reverse side of the same vane for the power stroke. This not only exacerbates the sealing problems inherent with this type of engine but requires complex machining during manufacture. It also means that cavities on each side of the rotor are used for compression and power strokes alternately.

It is therefore an object of the present invention to provide a new kind of internal combustion engine which does not suffer from these disadvantages.

SUMMARY OF THE INVENTION

According to the first aspect of the invention, in its broadest sense, there is provided an internal combustion engine, designed to convert thermal energy into mechanical energy according to the same general principle employed in conventional reciprocating piston-and-cylinder combustion engines, wherein:

(i) the equivalent of the cylinder of the conventional engine is replaced by two series of chambers, a first series and a second series, each series of chambers being separately disposed in a circumferential arrangement about a common axis and separated in space one from another; and (ii) wherein the conventional piston is replaced by one or more vanes, said vanes being adapted to form sealing contact with the chambers; and (iii) the two series of chambers being connected by one or more transfer ports;

characterized in that air is compressed in one series of chambers and combustion gasses are exhausted by means of the other series of chambers.

According to a second aspect of the invention, in its broadest sense, there is provided an internal combustion engine, designed to convert thermal energy into mechanical energy according to the same general principle employed in conventional reciprocating piston-and-cylinder combustion engines, wherein:

(i) the equivalent of the cylinder of the conventional engine is replaced by two series of chambers, a first series and a second series, each series of chambers being separately disposed in a circumferential arrangement about a common axis and separated in space one from another; and (ii) wherein the conventional piston is replaced by one or more vanes, said vanes being adapted to form sealing contact with the chambers; and (iii) the two series of chambers being connected by one or more transfer ports;

characterized in that ignition of compressed air/fuel mixture is initiated in the transfer port.

In a first preferred embodiment according to the first and second aspects of the invention there is provided an internal combustion engine comprising:

(i) a casing;

(ii) at least three discs, said discs being aligned on a common axis passing through the center of the flattened face of each disc (i.e the discs are stacked side by side or one on top of each other), the outer discs being fixed with respect to each other and rotatable with respect to the inner disc, which inner disc is preferably fixed;

(iii) a parallel-sided groove formed in the circumference of the two outer discs, said groove having a constant width profile and being adapted such that it exists in either one or other of the discs but not both, other than during a transitional period while the groove traverses from one outer disc to the other, said groove thus forming two series of chambers the first series being in the periphery of one outer disc and the second series being in the periphery of the other outer disc, the two series being separated by at least one inner disc;

(iv) a vane substantially the same width as the groove, said vane being constrained within a slot in the perimeter of the inner disc, said vane thus being fixed in relation to the direction of rotation of the outer discs, and said vane being adapted such that the vane can move from side to side in the slot to follow the path of the parallel-sided groove as it moves from one outer disc to the other;

(v) at least one inlet and one outlet port, preferably located in the engine casing;

(vi) at least one transfer port, also preferably located in the engine casing;

(vii) an ignition source, preferably a spark plug, and preferably located in the transfer port.

In a second preferred embodiment there is provided an internal combustion engine of the aforementioned type comprising;

(i) a disc mounted within a casing, the disc being rotatable with respect to the casing;

(ii) two series of elongate chambers formed in the circumference of the disc, the chambers of each series being located in end-to-end alignment and the two series being spaced apart on the circumferential perimeter of the disc;

(iii) at least one vane for each series of chambers, said vanes being constrained in the casing such that the vane can move radially towards and away from the disc to form a sealing contact with the chambers as they pass by;

(iv) at least one inlet and one outlet port, preferably located in the engine casing;

(v) at least one transfer port, also preferably located in the engine casing;

(vi) an ignition source, preferably a spark plug, and preferably located in the transfer port.

In a third preferred embodiment there is provided an internal combustion engine comprising;

(i) a disc mounted within a casing, the disc being rotatable with respect to the casing;

(ii) two series of elongate chambers formed in the inner circumference of the casing, the chambers of each series being located in end-to-end alignment, the two series being spaced apart on the inner circumferential perimeter of the casing;

(iii) at least one vane for each series of chambers, said vanes being constrained within the disc such that the vanes can move radially towards and away from the casing;

(v) at least one inlet and one outlet port, preferably located in the engine casing;

(vi) at least one transfer port, also preferably located in the engine casing;

(vii) an ignition source, preferably a spark plug, and preferably located in the transfer port.

In a fourth preferred embodiment there is provided an internal combustion engine comprising:

(i) a casing;

(ii) a disc;

(iii) an inner ring concentric with and surrounding the perimeter of the disc;

(iv) an outer ring, concentric with both the inner ring and the disc and surrounding the outer ring, the disc and outer ring being fixed with respect to each other and rotatable with respect to the inner ring, said outer ring preferably forming part of the engine casing;

(v) a groove formed in the outer circumference of the disc and the inner circumference of the outer ring, said groove having a constant width profile and being adapted such that it exists in either the disc or the outer ring but not both, other than during a transitional period whilst the groove traverses from the disc to the outer ring or vice versa, said groove thus forming two series of chambers the first series being in the disc and the second series being in the outer ring, the two series being separated by the inner ring;

(vi) a vane substantially the same width as the groove, said vane being constrained within a slot in the inner ring, said vane thus being fixed in relation to the direction of rotation of the disc and the outer ring, and said vane being adapted such that the vane can move from side to side in the slot to follow the path of the parallel-sided groove as it moves from the disc to the outer ring and back again;

(vii) at least one inlet and one outlet port, preferably located in the engine casing;

(viii) at least one transfer port, also preferably located in the engine casing;

(ix) an ignition source, preferably a spark plug, and preferably located in the transfer port.

In a fifth preferred embodiment there is provided an internal combustion engine of the aforementioned type comprising;

(i) a casing;

(ii) a disc, the disc being rotatable with respect to the casing;

(iii) two series of grooves formed in the face of the disc as opposed to its periphery, the first series of grooves and the second series of grooves being formed respectively in two substantially concentric circles, the centre of the circles being the rotational axis of the disc, such that in combination with the casing these grooves form two series of chambers separated radially outwardly from each other;

(iv) at least one vane for each series of chambers, said vanes being constrained in the casing such that the vanes can only move in a direction parallel to the rotational axis of the disc;

(v) at least one inlet and one outlet port, preferably located in the engine casing;

(vi) at least one transfer port, also preferably located in the engine casing;

(vii) an ignition source, preferably a spark plug, and preferably located in the transfer port.

Preferably the vane comprises a series of vane elements in substantially parallel, non-coaxial, corresponding end alignment.

Preferably the vane is formed from two or more vane portions characterised in that in use one or more of the portions are positively forced into sealing contact with the chamber surface.

Preferably the positive force is exerted by means of a spring.

In a particularly preferred embodiment the positive force is exerted by means of hydraulic pressure where the hydraulic fluid is preferably oil.

In a further preferred embodiment the vane takes the form of a pivoted cam adapted to form a sealing contact with and to follow the contours of the chambers.

The vane may also be formed from one or more hinged flaps adapted to form a sealing contact with and to follow the contours of the chambers.

In a still further embodiment the vane, rather than merely following the contours of the chambers, is positively forced into sealing contact with the chamber walls and is moved so as to follow the chamber contours, movement of the vane being achieved by means of a drive mechanism.

BRIEF DESCRIPTION OF THE DRAWINGS

A preferred embodiment of the present invention will now be more particularly described by way of example, with reference to the accompanying drawings, wherein FIGS. 1 to 9 relate to a first preferred embodiment.

DESCRIPTION OF THE PREFERRED EMBODIMENT

The embodiments shown in FIGS. 1–16 represents currently the best ways known to the applicant of putting the invention into practice.

Reference will be made, wherever possible, to the equivalent parts of a conventional internal combustion engine.

Figure 1:
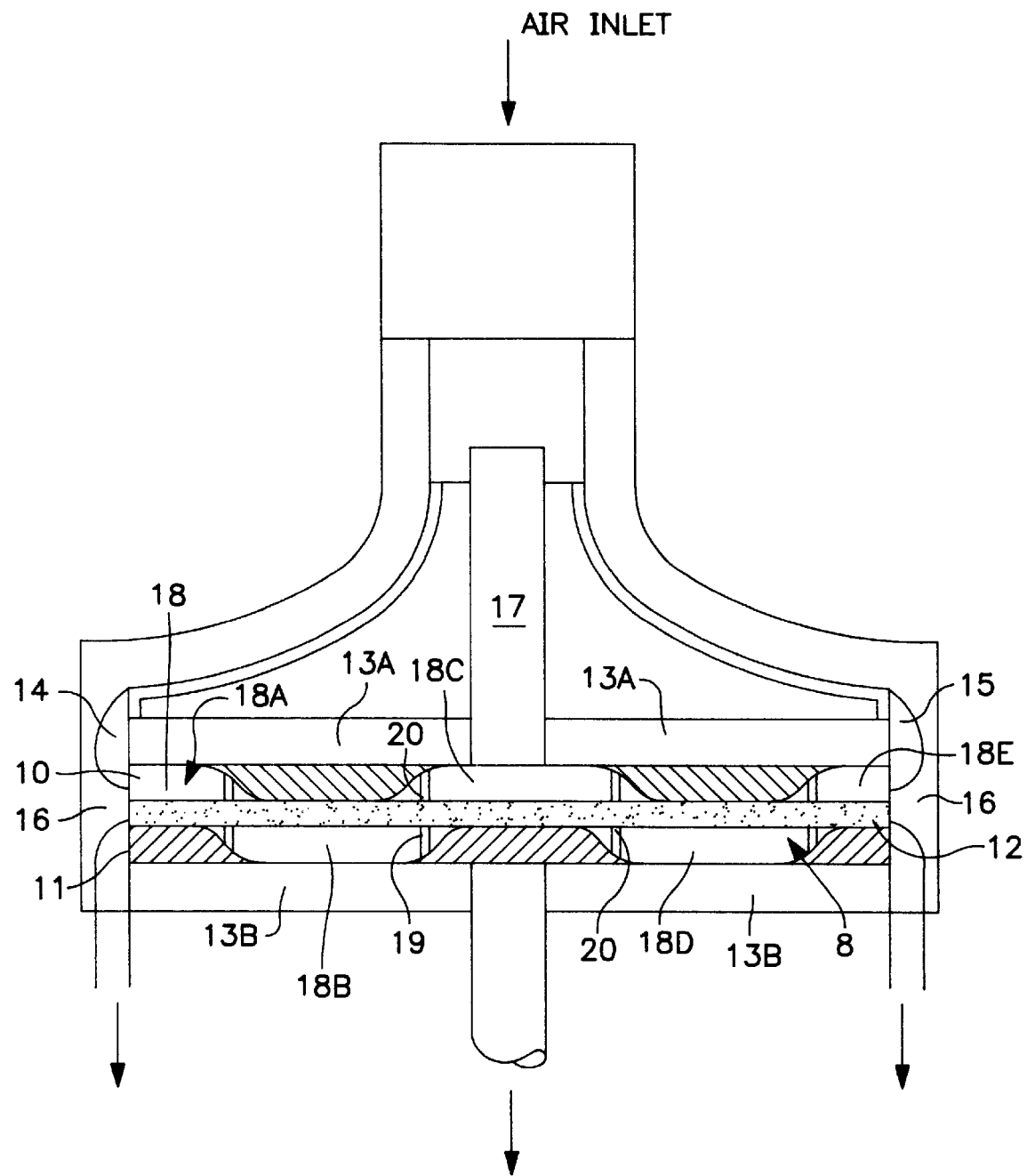
FIG. 1 shows a diagrammatic cross-sectional view of an engine casing and concentric discs according to the invention.
Figure 2A:
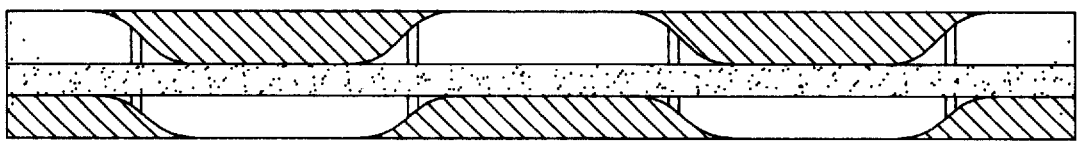
FIGS. 2A and 2B are side and top views, respectively, of the perimeter of three circular discs incorporating a groove.
Figure 2B:
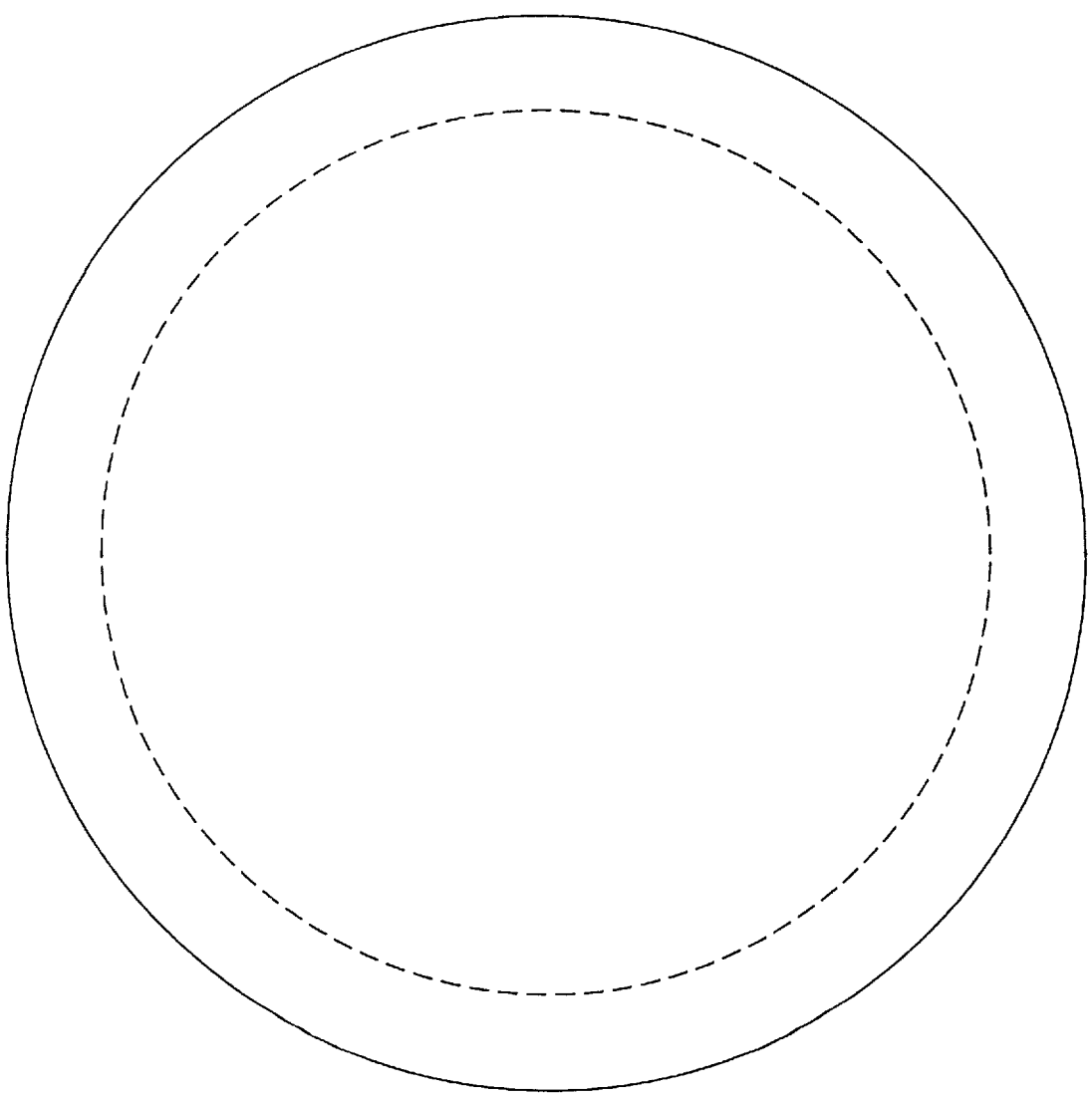
Figure 3A:
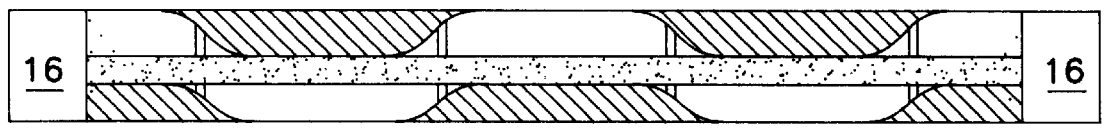
FIGS. 3A and 3B are side and top views, respectively, of a section of the casing around the perimeter of three circular discs as shown in FIGS. 2A and 2B.
Figure 3B:
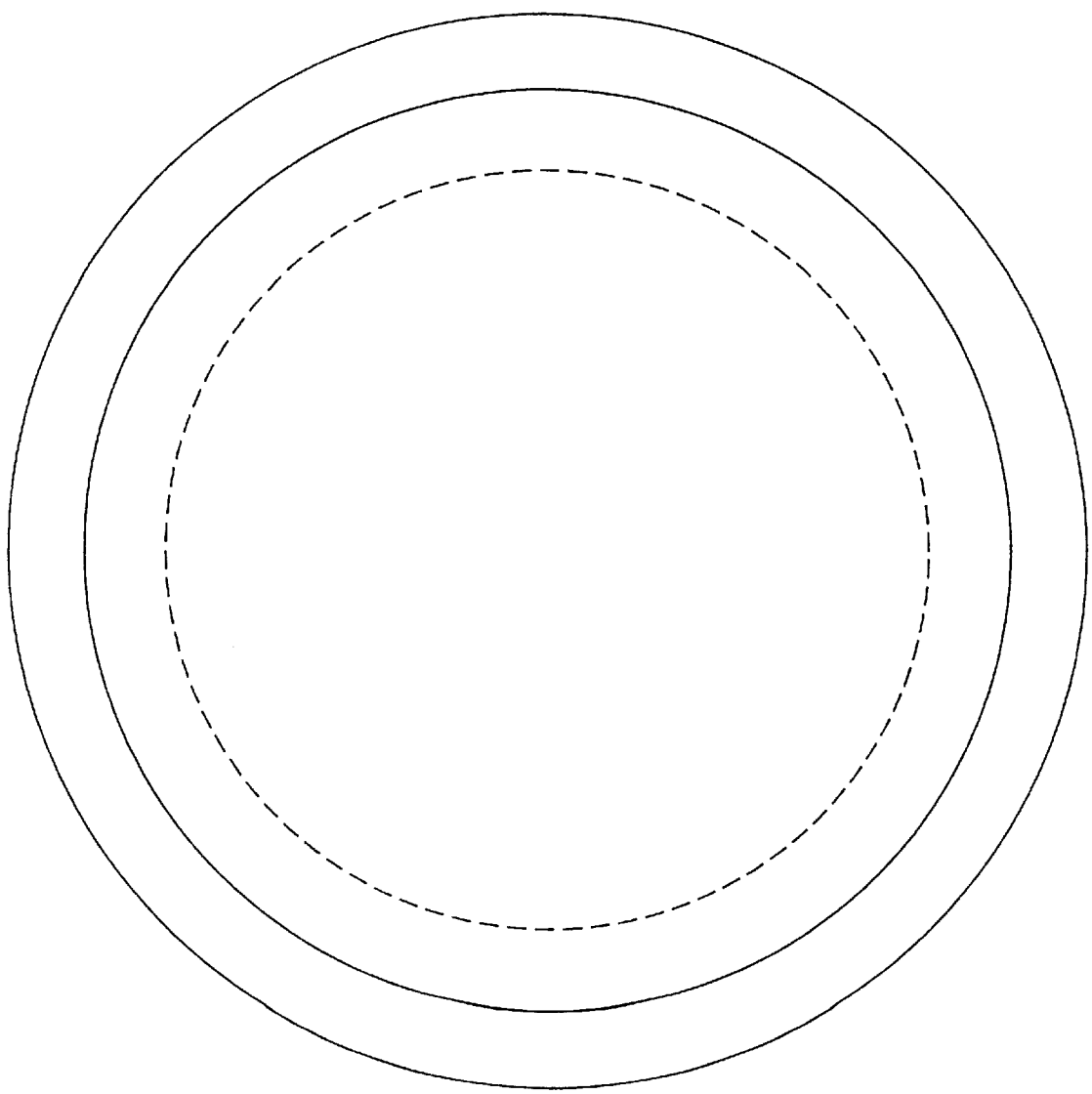

FIG. 1 shows schematically the elements of an engine according to a first preferred embodiment of this invention. It illustrates three concentric discs 10, 11 and 12 which are housed within a casing 13 which in turn has apertures 14 and 15 through which a combustion mixture and exhaust gases can enter and exit respectively. The casing is equivalent to an engine block in a conventional engine. The portion of the casing engine 16 around the perimeter of the discs 10–12 corresponds to a conventional cylinder head.

The basic concept is as follows. The inner disc 12 is fixed and on either side of the inner disc are located two, outer rotatable discs 10 and 11. The outer discs are locked together such that they rotate as a single entity. This can conveniently be achieved by means of a drive shaft 17 that sits in a bearing (not shown) in the fixed disc 12. It will therefore be appreciated that the casing 13 and inner disc 12 are fixed in relation to one another and the outer discs 10 and 11 rotate about a central shaft.

The channel 18 is formed only in the periphery of the discs 10 and 11, which in turn are encased within the housing 16. The diameter of the inner disc is at least as great as the two outer discs and thus it forms a gas-tight barrier between those parts of the channel on one side, 18A, 18C and 18E (series one) and those parts of the channel on the opposite side, namely 18B and 18D (series two). This creates what is in effect two series of chambers, one series being located entirely in the periphery of one outer disc and the other series being in the other.

The term disc in this context has a broad meaning. Clearly the perimeter of each disc must be substantially circular in order that it can rotate within the engine casing 16. The various discs must also be a mating fit at their perimeter, as shown in FIG. 1, in order to create a substantially gas-tight channel. The remainder of the disc can take a wide variety of shapes and configurations. For example, it is likely that cooling and lubrication would be needed in the internal region of each disc, particularly on the side of the engine where combustion gases are exhausted (see below). This will require cooling and lubrication ports as well as some form of circulation system. It is envisaged that both air, water and oil cooled versions will be produced, depending on the use to which the engine is going to be put. The discs can therefore be flat-faced as with a stack of washers, for example, or hollowed i.e dished.

In the circumference of the rotatable outer discs is what amounts to a parallel-sided groove or channel 18. This groove has a fixed width and is adapted such that the groove may exist in either of the outer discs but not in both, except where it traverses from one disc to another.

The profile of the groove is likely to affect the performance and durability of the engine and this description is intended to cover all possible profiles.

The fixed disc 12 contains vanes 19 which are retained in slots 20 in the perimeter of disc 12. The vanes extend fully across the width and depth of the groove 18 and form a substantially gas-tight barrier. The vanes are fixed in relation to the direction of the rotation of the outer discs but may move freely within the groove to follow the course of the groove as it traverses from one rotatable disc to another. As well as being supported by disc 12 the vanes also extend into and are further supported by the casing 16.

In a conventional engine, these vanes would correspond to the pistons. It will be appreciated therefore that these vanes can have a very low mass and thus the inertia of the reciprocating element in this new type of engine is also low.

As previously described the inner disc 12 provides a gas-tight seal between one series of chamber and the other. However, there are specifically adapted connecting ports called transfer ports shown as 23A, 23B & 23C in FIGS. 4 & 5. The transfer ports are formed in the casing 16 and create a direct connection between the inlet side of the engine and the exhaust side. They are also where ignition is initiated, generally by means of a spark plug supported in the casing. The function of these transfer ports will be revealed by the description of the combustion cycle below.

An outer ring or casing 16 is secured around the three discs 10–12. In effect, the casing in its entirety comprises two fixed discs 13A and 13B together with an outer ring 16 which fits over all five discs. This outer ring provides mechanical support for the previously described components.

Figure 4:
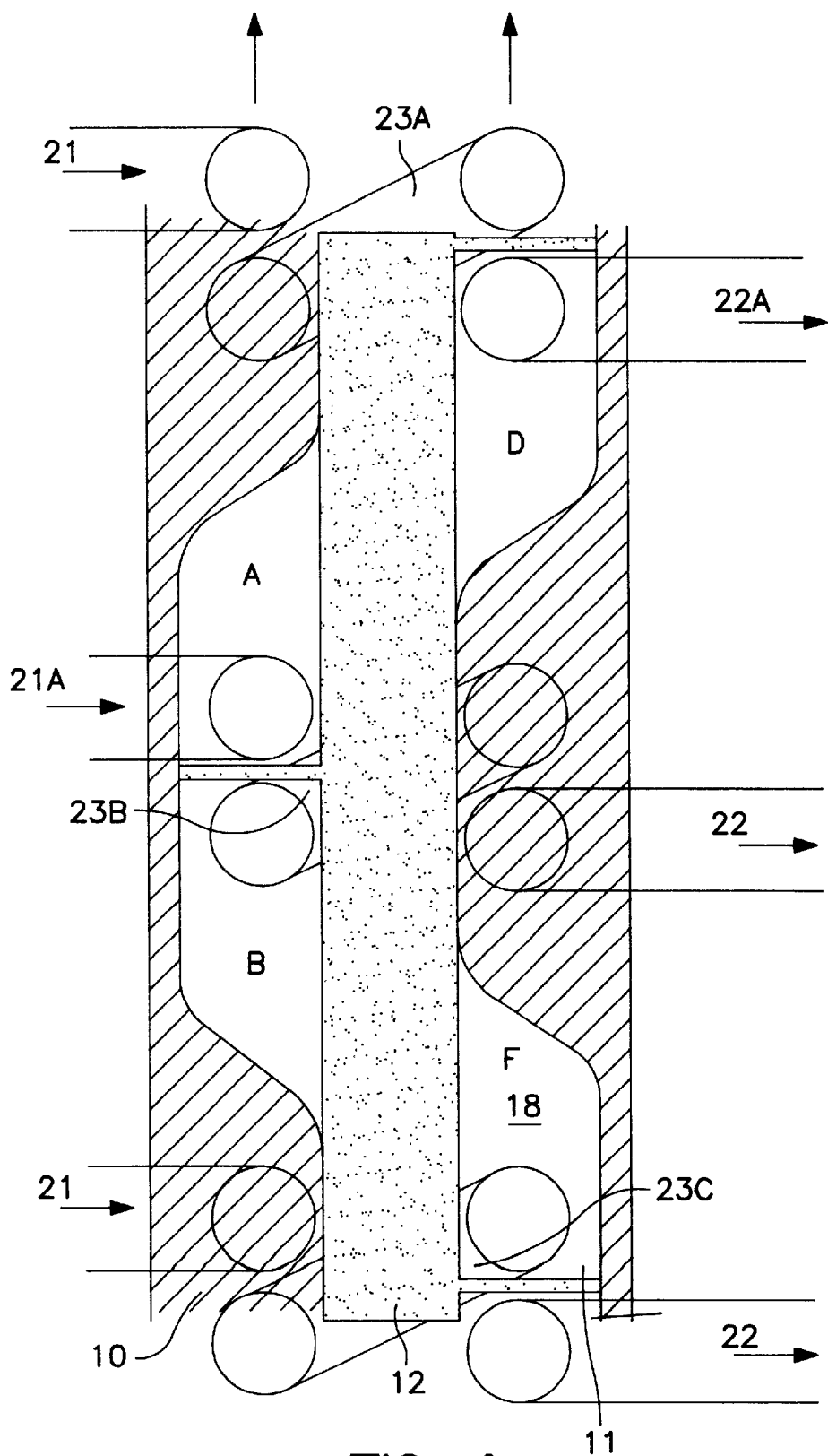
FIG. 4 shows schematically a portion of the perimeter of three discs and a groove traversing between the discs.
Figure 5:
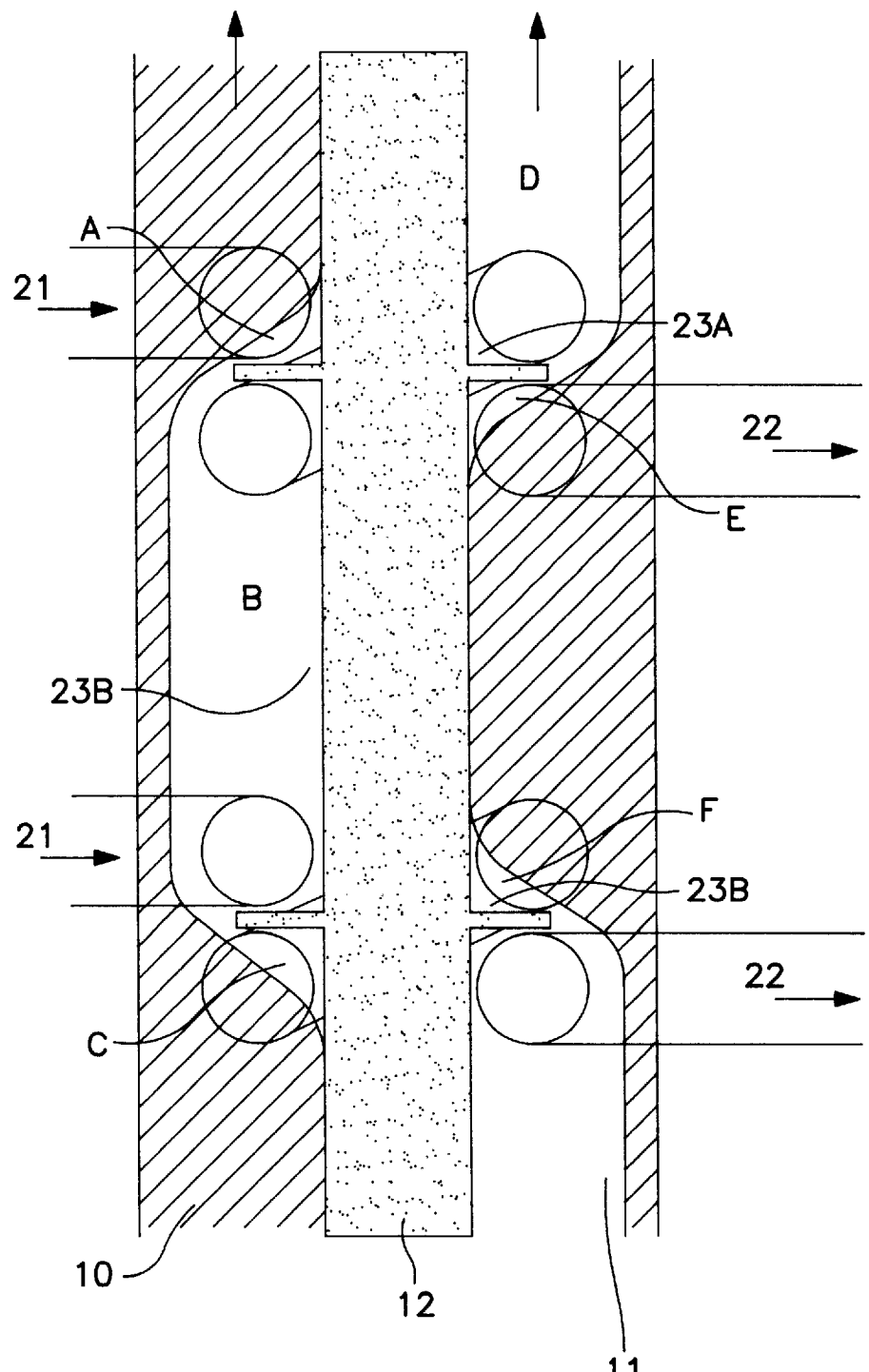
FIG. 5 shows schematically a portion of the perimeter of three discs in a different part of the internal combustion cycle.

The combustion cycle will now be described in detail with reference to FIGS. 4 and 5. These depict a portion of the groove 18 in various stages in the process and in which a variety of cavities or chambers are created as the groove sweeps past the static vanes. These stages are:

1. FIG. 4

Chamber A is enlarging drawing fuel air mixture into it.

Chamber B is decreasing compressing the fuel air mixture into transfer port 23B, note right hand side of 23B is closed. Fuel/air mixture can enter the transfer port but cannot escape because the other end of the port is sealed.

Chamber D is decreasing pushing exhaust gases out of exhaust port 22A.

Chamber F is expanding under the pressure of the ignited gases expanding from transfer port 23C and into chamber F. Note transfer ports 23A and 23C are both in the firing cycle i.e. both sides of the vane are active at all times.

2. FIG. 5

Chamber A is just starting to open about to start an intake cycle.

Chamber B is fully open and full of fuel/air mixture [bottom dead centre in conventional terms (BDC)].

Chamber C is fully compressed with fuel/air mixture compressed into transfer port 23B and therefore into chamber F and is ready for ignition and subsequent expansion into chamber F [top dead center in conventional terms (TDC)].

Chamber D is fully expanded (BDC) and about to start an exhaust cycle.

Chamber E is fully closed after an exhaust cycle.

This cycle is repeated around the perimeter of the discs.

Figure 7:
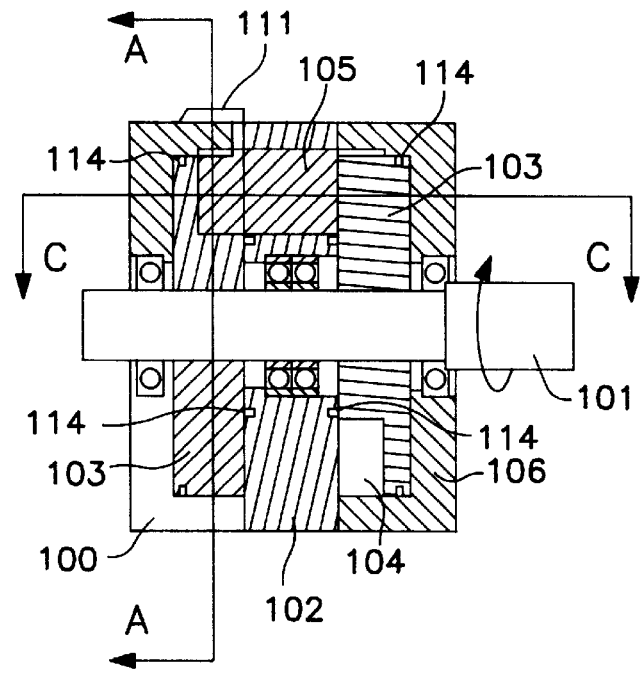
FIGS. 7, 8 and 9 show more detailed cross-sections of a further version of the first preferred embodiment.
Figure 8:
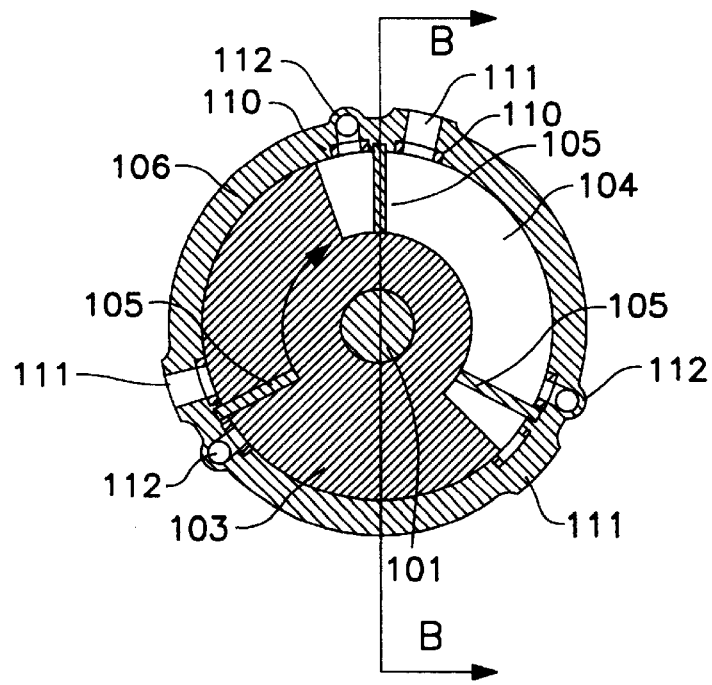
Figure 9:
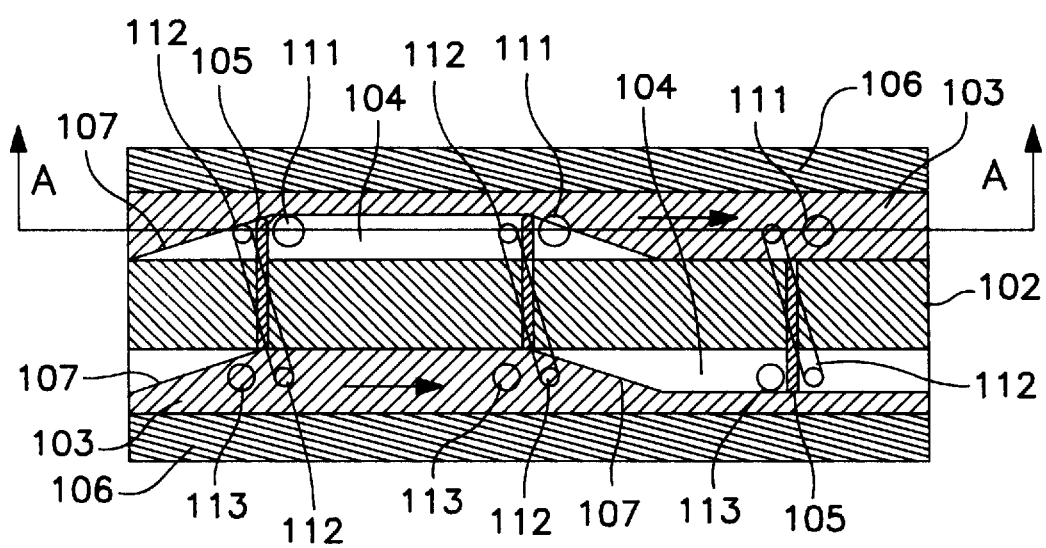

This particular embodiment of the engine is shown in more detail in FIGS. 7, 8 and 9. These show a three vane-two chamber version. In this context therefore a series of chambers can include just a single chamber e.g 104 divided by one or more vanes.

A number of features will have become apparent from the foregoing description. For example, the compression cycle always takes place in one series of chambers on the same side of the engine, i.e in the periphery of one disc in this example. Conversely the power stroke takes place in the opposite disc. This brings with it a number of advantages, firstly, alternate heating and cooling is avoided, each disc running at a fairly constant temperature. As well as avoiding rapid expansion/contraction it also means that special arrangements can be made to remove heat from the exhaust side of the engine.

Secondly it is no longer necessary for the compression stroke and the power stroke to be the same volume. They can be varied independently and practically at will, simply by changing the size, shape, length and/or depth of the chambers on each side of the disc. The transfer ports may need to be angled or staggered accordingly but this is a relatively simple matter.

Firing can now take place at TDC unlike in a conventional engine where it usually occurs some 10° to 20° before TDC, thus increasing output since the full force of the explosion is used to propel the vane.

The power stroke is applied tangentially to the periphery of a rotor leading to optimum power use.

By allowing combustion to start in a transfer port the full range of carburation/fuel injection/diesel options are possible. That is to say, fuel may be introduced along with air in a carburetor aspirated version. Alternatively fuel can be injected into the compression chamber at an appropriate point. High pressure fuel injection can be used to inject fuel directly into the transfer port just prior to ignition.

The internal shape of the transfer port is important in achieving complete combustion and the techniques applied in conventional gasoline engines may also be applied here. Conventional spark plugs can be used to initiate combustion of the fuel/air mixture in a similar manner to conventional engines. Timing of the ignition spark can also be achieved by conventional means.

The arrangement of discs and chambers described above is just one of the many possible configurations. Alternatives are shown in FIGS. 10–13 inclusive.

Figure 10B:
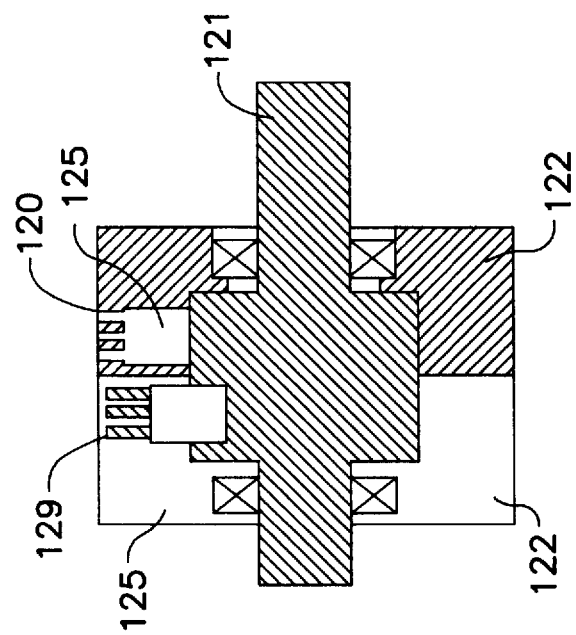
FIGS. 10A and 10B show two cross-sectional views of a second preferred embodiment having spring-loaded vanes and FIGS. 10C and 10D show two comparable cross-sectional views of a second preferred embodiment using hydraulic fluid-pressured vanes.
Figure 10A:
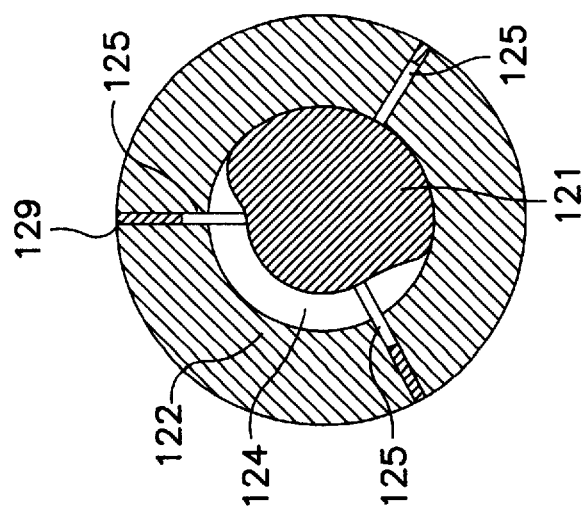
Figure 10D:
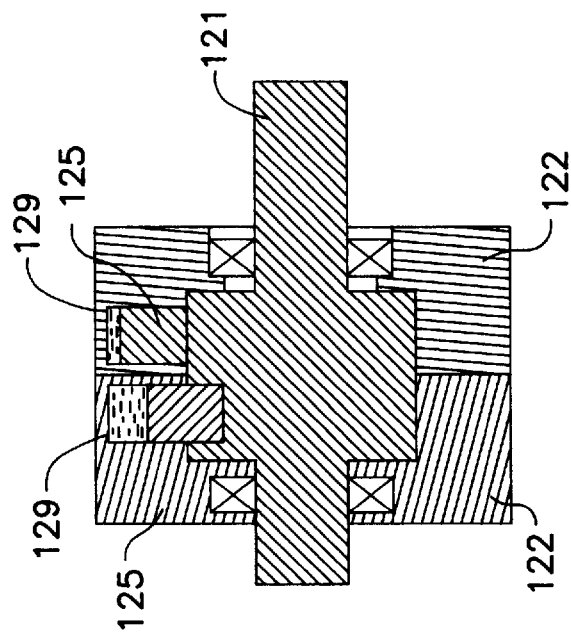
Figure 10C:
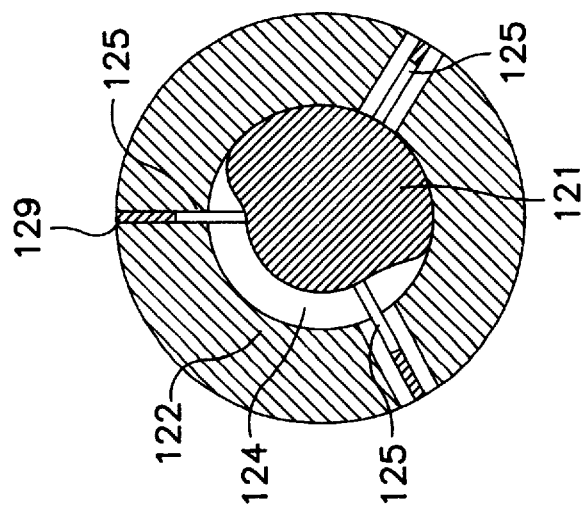

FIGS. 10A and 10B shows an arrangement whereby the two series of chambers 1–4 are arranged side by side but spaced apart in the perimeter of a single disc 121. Rather than traversing at right angles to the direction of rotation of the disc, the vanes in this example move radially towards and away from the output shaft, riding up and down on the base of the channels. The vanes are maintained in contact with the channels by spring-loading (FIGS. 10A and 10B) or hydraulic pressure (FIGS. 10C and 10D) which can be applied by conventional means, the vanes being held in a static housing.

Figure 11B:
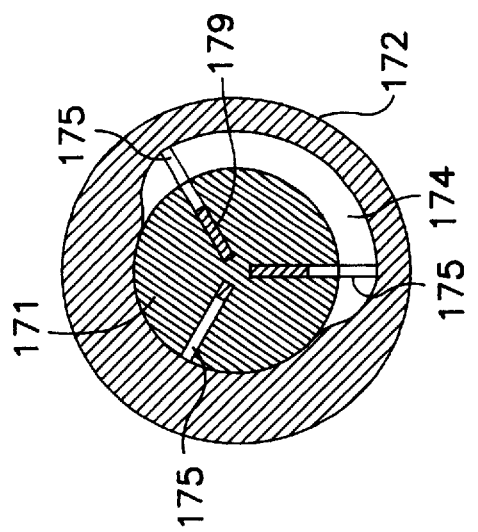
FIGS. 11A and 11B show two cross-sectional views of a third preferred embodiment.
Figure 11A:
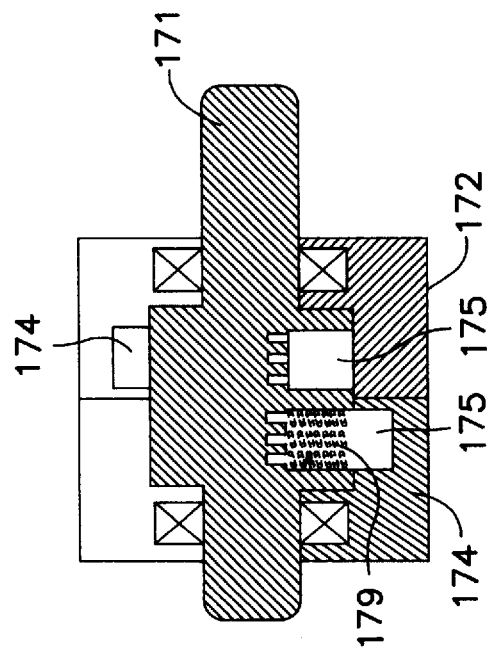

FIGS. 11A and 11B shows the inverse of this arrangement wherein the vanes are retained in an inner disc 171 and the channels are located in the inner surface of the outer housing 176.

Figure 12B:
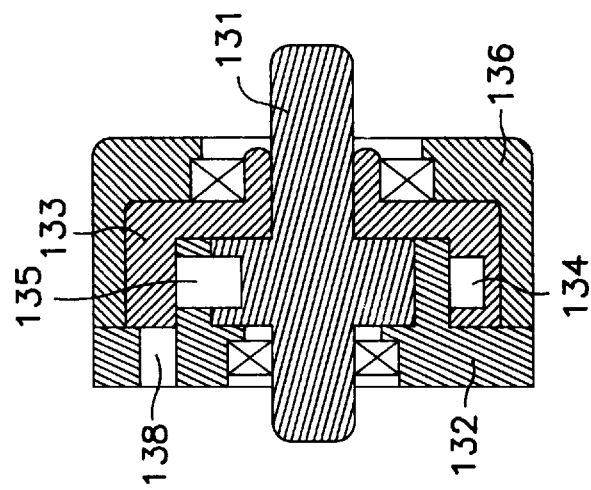
FIGS. 12A and 12B shows two cross-sections views of a fourth preferred embodiment.
Figure 12A:
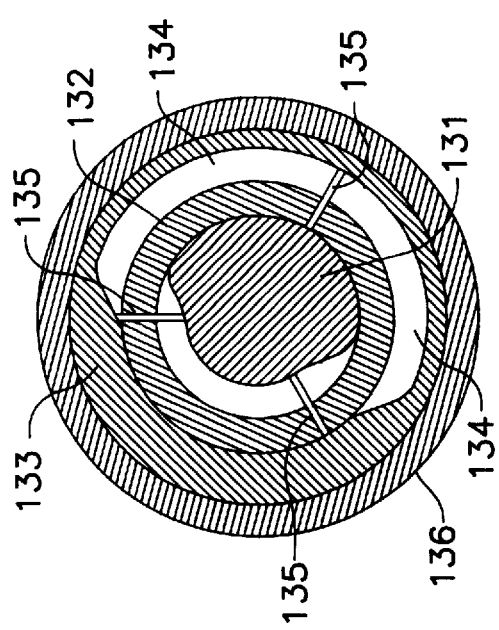

A further preferred embodiment is illustrated in FIGS. 12A and 12B. In this example an inner 131 and an outer 133 disc rotate together on an output shaft and a stator 132 separates the two rotating discs. The stator, or fixed disc 132, contains vanes 135 which are retained in slots not dissimilar to those described in FIGS. 1–5. One series of chambers is formed in the outer disc 133 and a complimentary series of chambers is formed in the inner disc 131. Once again the vanes moved radially towards and away from the output shaft.

Figure 13B:
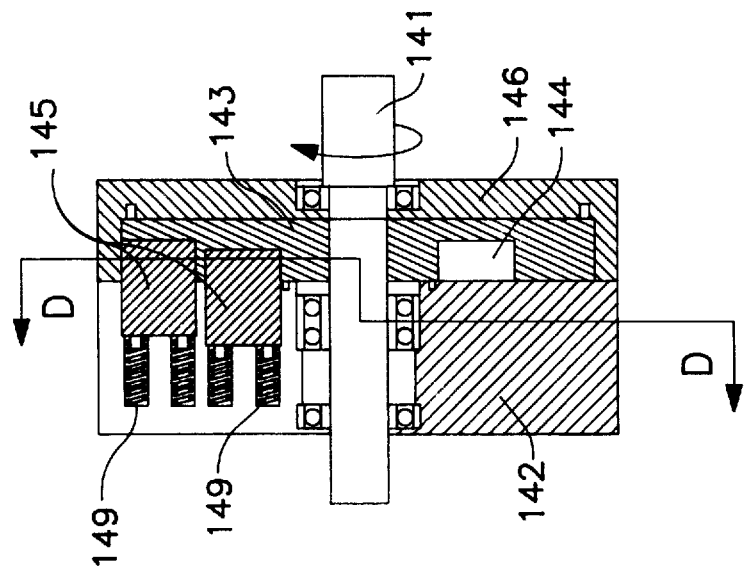
FIGS. 13A and 13B shows two cross-sectional views of a fifth preferred embodiment.
Figure 13A:
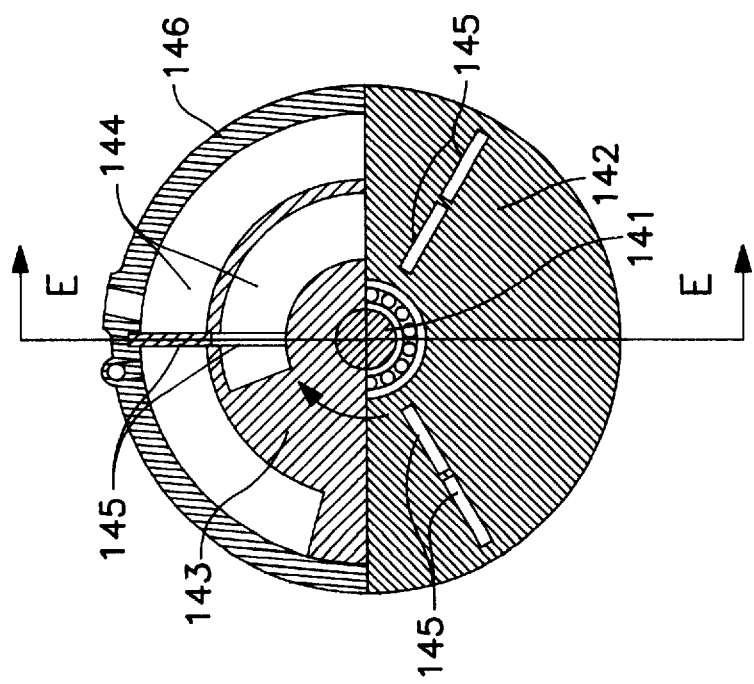

FIGS. 13A and 13B illustrates an arrangement whereby two series of chambers 144 are formed in the face of a disc, rather than in its periphery. The chambers take the form of a series of grooves arranged in two concentric circles, the center of each circle being the output shaft. Each vane in this example consists of two vane portions 145 operating independently. Once again the vanes are maintained in sealing contact with the chambers by spring or hydraulic pressure.

These are just some of the permutations possible with this invention but there are others which have not been illustrated here. Each example incorporates the necessary number of inlet and outlet ports, a transfer port associated with each vane or set of vane portions, and an ignition source associated with each transfer port.

These examples further serve to illustrate the broad meaning of the term disc in this specification. This term is intended to encompass any rotatable or static member which can accommodate channels or vanes.

Although not specifically illustrated it is possible to vary the relative juxtaposition of the compression and exhaust chambers and thus alter the timing and power output of the engine. This provides a further option not available in a conventional engine design.

The number of chambers in each series and the number of vanes can be varied to suit the requirement of a particular engine and have a direct bearing on the performance on the engine. The rotating chamber profile also have a significant influence on:

a) operation of the sealing vanes;
b) port timings;
c) size of the engine.

The ramping angle profile of the cavities provide the effort required to operate the sliding vanes. If the angle is too large then a high load will be inparted to the vane tip resulting in high friction of the interfaces and bending moments together with a high reciprocating velocity of the vane.

The ramping angle also controls the timing events of the engine's operating cycles. These events will also depend upon the profile of the ports located in the outer casing of the engine. The cavity cross-sectional profile can be configured in various proportions and shapes. The selected shape influence a number of parameters such as:

overall size of the engine;
number of cavities;
stroke of vanes;
size and shape of ports.

As with all current engines the effectiveness of the sealing of its chambers containing the working gases is one of the keys to an efficient engine design. This applies to conventional reciprocating piston and rotary engines. Dynamic sealing is one of the most demanding tasks, having to contend with the forces generated by velocity and acceleration of the seal and its interfacing components. This particular engine requires a number of dynamic seals to be maintained for efficient operation.

Figure 6A:
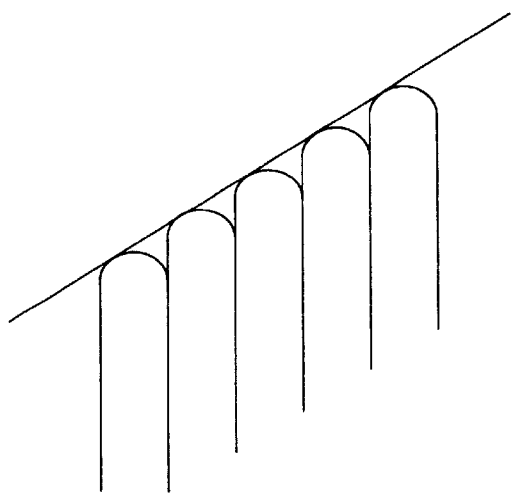
FIGS. 6A and 6B show two possible arrangements of vanes and multi-component spring-loaded systems (FIG. 6B) for use as vanes.
Figure 6B:
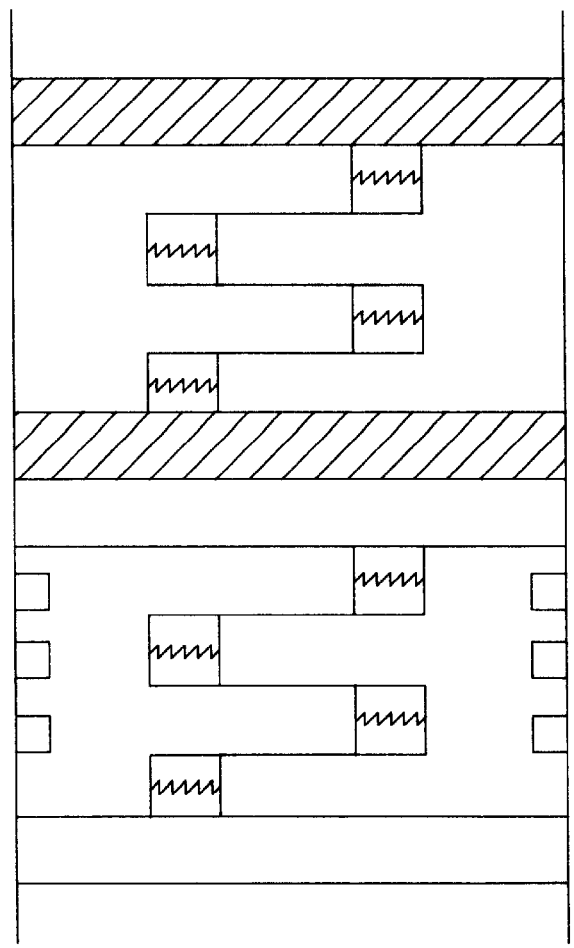

Sealing of the vanes, to retain the gases and pressures has to be accomplished around the profile of the rotating channel formed in the discs. The channel cannot be fully circular and therefore the sealing elements have to be capable of exerting a force at the interfaces of vanes, channel and possibly stator slots. The sealing faces of the vane also have to accommodate a rubbing/reciprocating action which, depending upon the size of the engine, could result in high velocities and accelerations. This can be achieved in a number of ways and it must also be remembered that the slider-type vane must have the necessary resilient properties to follow the contours of the groove 18 as well as being hard-wearing. Optionally, the vane can be constructed from a series of parallel vane elements 24 as illustrated in FIG. 6. The vane elements are free to move parallel to each other and this arrangement has the advantage of reducing both friction and the wear as the vane 19 follows the traversing groove 18.

In a further option the vane or vane components can be made in two or more portions, which meet in the plane of the fixed disc 12. The portions are forced apart, and thus into contact with the walls of the groove, by a spring or other elastomeric component or by lubricant pressure. In this way it is possible to compensate for the inevitable wear that takes place in use at the end of the sliders.

Figure 14:
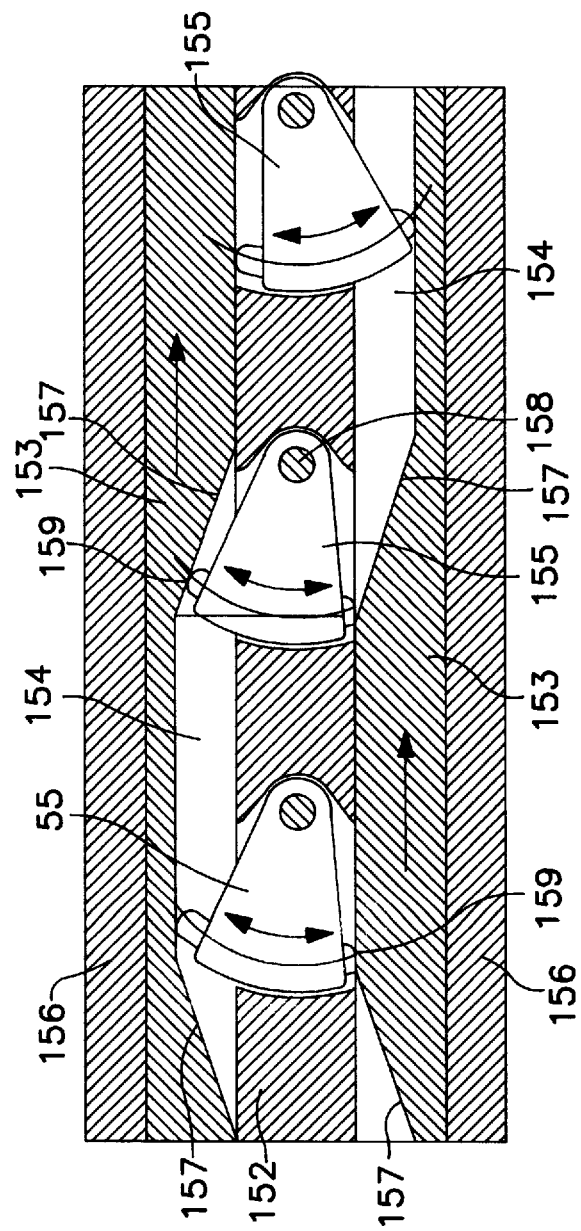
FIG. 14 shows a series of vanes in the form of pivoting cams.
Figure 15:
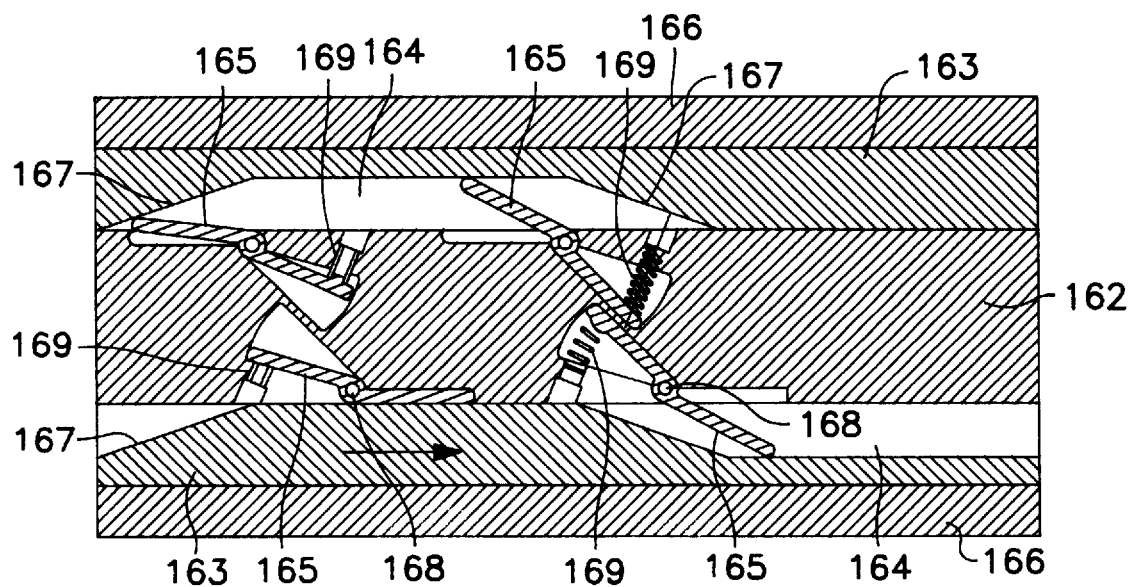
FIG. 15 shows a series of vanes in the form of pivoting flaps.

Various alternative vane constructions are shown in FIGS. 14 and 15. FIG. 14 shows a series of cams 155, pivoted towards one end about pivot 158, such that the cams can swing from side to side so as to follow the contours of the channel 154 as it traverses from disc to disc as described in the first preferred embodiment. This offers a number of advantages. Firstly a cam is inherently better able to withstand the pressures and forces experienced inside an engine. Secondly, sealing elements 59 can be incorporated at strategic points into the cam and these can be spring or hydraulically loaded into sealing contact with the chamber walls.

If necessary, provision can also be made to drive these cams such that they positively follow the path of the channel rather than simply being guided by its course although this will, of necessity, lead to a more complex engine design.

A further variant is shown in FIG. 15 which depicts an alternative form of pivoted vane. In this example a vane 165 is pivoted about a pivot 168, the pivot point being within the static disc 162. The vanes are spring-loaded by springs 69 to encourage sealing contact with the sides of the channels. In effect, a vane 165 has been split into two vane portions 165A and 165B operating independently of each other. This enables each vane portion to be positioned at the optimum contact angle with respect to the channel wall.

This entirely new concept in engine design brings with it a number of important advantages. Firstly, the diameter of the discs, i.e the rotating part of the engine can be kept relatively small. Thus the entire power unit can be small in both size and weight. Such an engine will find new applications in, for example, small domestic garden tools such as strimmers where petrol-engined versions have previously only been employed in industrial-type units.

Figure 16:
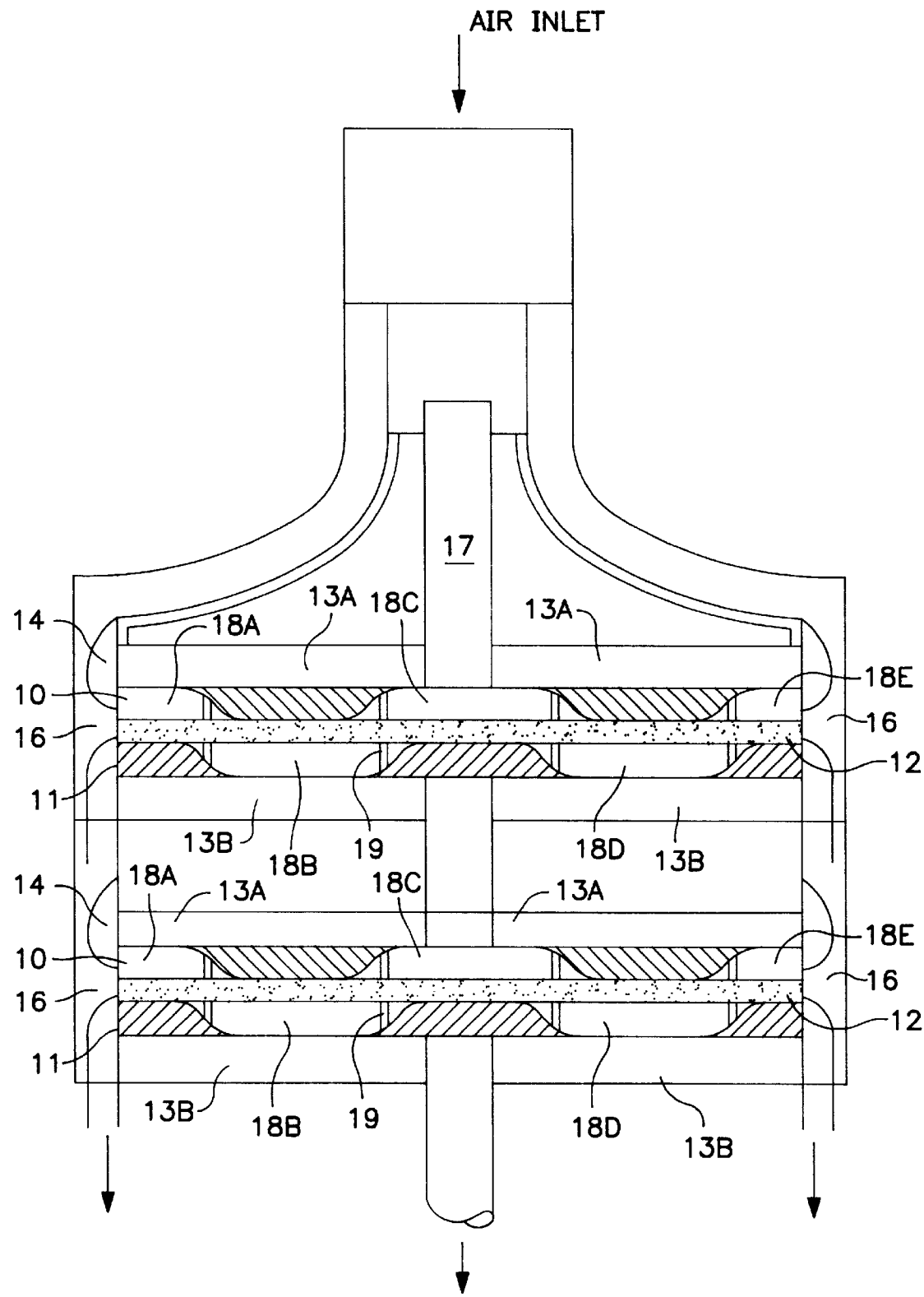
FIG. 16 shows a diagrammatic cross-sectional view of a plurality of engines according to the invention mounting in series on a single shaft.

Equally importantly, by keeping the radius of the discs small the sliding/rubbing velocity between the disc and stator is smaller than it would otherwise be. This reduces the heat generated at the seals which in turn reduces the possibility of friction welding. In effect the smaller the diameter of the rotating disc(s) the higher the maximum rpm of the engine. Secondly, if a more powerful engine is required this can be achieved simply by incorporating additional units onto the same output shaft. As shown in FIG. 16, each engine module is in effect a self-contained unit and as many as necessary can be linked in series for any given application. Thus, it is theoretically possible to produce a standard engine module and simply combine any number of these together to obtain the necessary performance for a particular application. This has obvious advantages over the current situation where a car manufacturer for instance produces a whole series of different engines to power a range of vehicles.

The precise details needed to put the invention into practice will form an inevitable part of the common general knowledge of the intended skilled addressee of this specification.

We claim:

1. An internal combustion engine comprising:
   (i) a casing;
   (ii) a least three discs, said discs being aligned on a common axis passing through the center of the flattened face of each disc, the outer discs being fixed with respect to each other and rotatable as a single entity with respect to the inner disc;
   (iii) a parallel-sided groove formed in the flattened face of the two outer discs, said groove having a constant width profile and being adapted such that it exists in either one or other of the discs but not both, other than during a transitional period while the groove traverses from one outer disc to the other, said groove thus forming two series of chambers, the first series being in the flattened face of one outer disc and the second series being in the flattened face of the other outer disc, the two series being separated by the inner disc;
   (iv) a vane substantially the same width as the groove, said vane being constrained within a slot in the perimeter of the inner disc, said vane thus being fixed in relation to the direction of rotation of the outer discs, and said vane being adapted such that the vane can move from side to side in the slot to follow the path of the parallel-sided groove as it moves from one outer disc to the other;
   (v) at least one inlet and one outlet port, located in the engine casing;
   (vi) at least one transfer port located in the engine casing, adapted to connect the first and second series of chambers;
   (vii) an ignition source located in said at least one transfer port for initiating ignition in said at least one transfer port;

the inner disc and the casing being static in relation to each other such that, in use, the two outer discs rotate with respect to the inner disc and with respect to the casing.

2. An internal combustion engine as claimed in claim 1 wherein the vane comprises a series of vane elements in substantially parallel, noncoaxial, corresponding end alignment.

3. An internal combustion engine as claimed in claim 1 wherein the vane comprises a plurality of vane portions and means for positively forcing at least one of said portions into sealing contact with the chamber surface.

4. An internal combustion engine as claimed in claim 1 wherein the vane takes the form of a pivoted cam adapted to form a sealing contact with and to follow the contours of the chambers.

5. An internal combustion engine as claimed in claim 1 wherein the vane is formed from one or more hinged flaps adapted to form a sealing contact with and to follow the contours of the chambers.

6. An internal combustion engine as claimed in claim 1 wherein the vane, rather than merely following the contours of the chambers, is positively forced into sealing contact with the chamber walls and is moved so as to follow the chamber contours, movement of the vane being achieved by means of a drive mechanism.

7. An internal combustion engine comprising a plurality of engines as claimed in claim 1 mounted in series on a single shaft, the power output from the combination being substantially the sum of the power output from each individual engine.

8. An internal combustion engine as claimed in claim 1, wherein said ignition source is a spark plug.

9. An internal combustion engine as claimed in claim 3, wherein said means for positively forcing comprises hydraulic fluid.

10. An internal combustion engine as claimed in claim 9, wherein said hydraulic fluid is oil.

11. An internal combustion engine as claimed in claim 3, wherein said means for positively forcing comprises spring means.

* * * * *